March 7, 1950 M. H. TUFT 2,499,615
AGRICULTURAL IMPLEMENT
Filed May 19, 1945 3 Sheets-Sheet 2
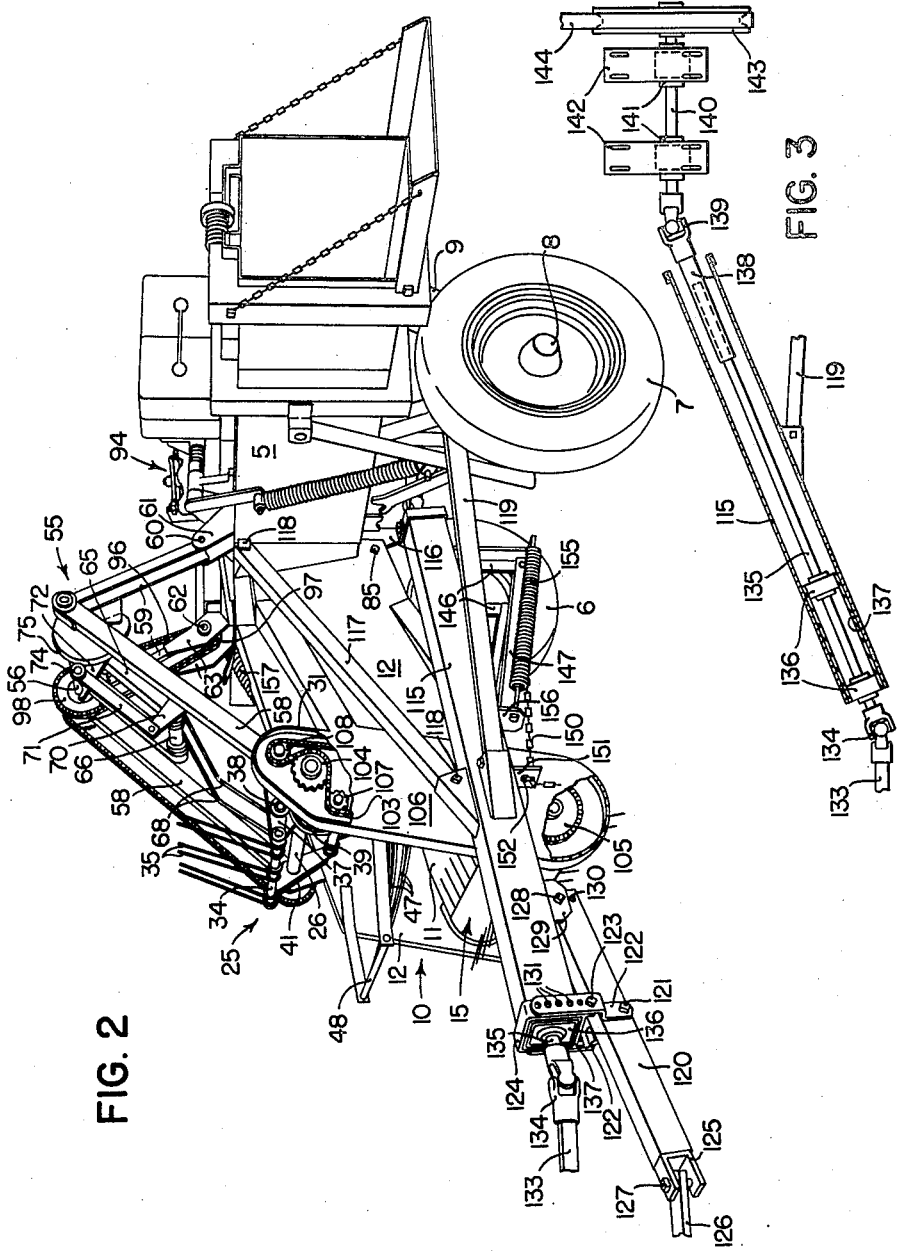
INVENTOR.
MILES H. TUFT
BY
ATTORNEYS

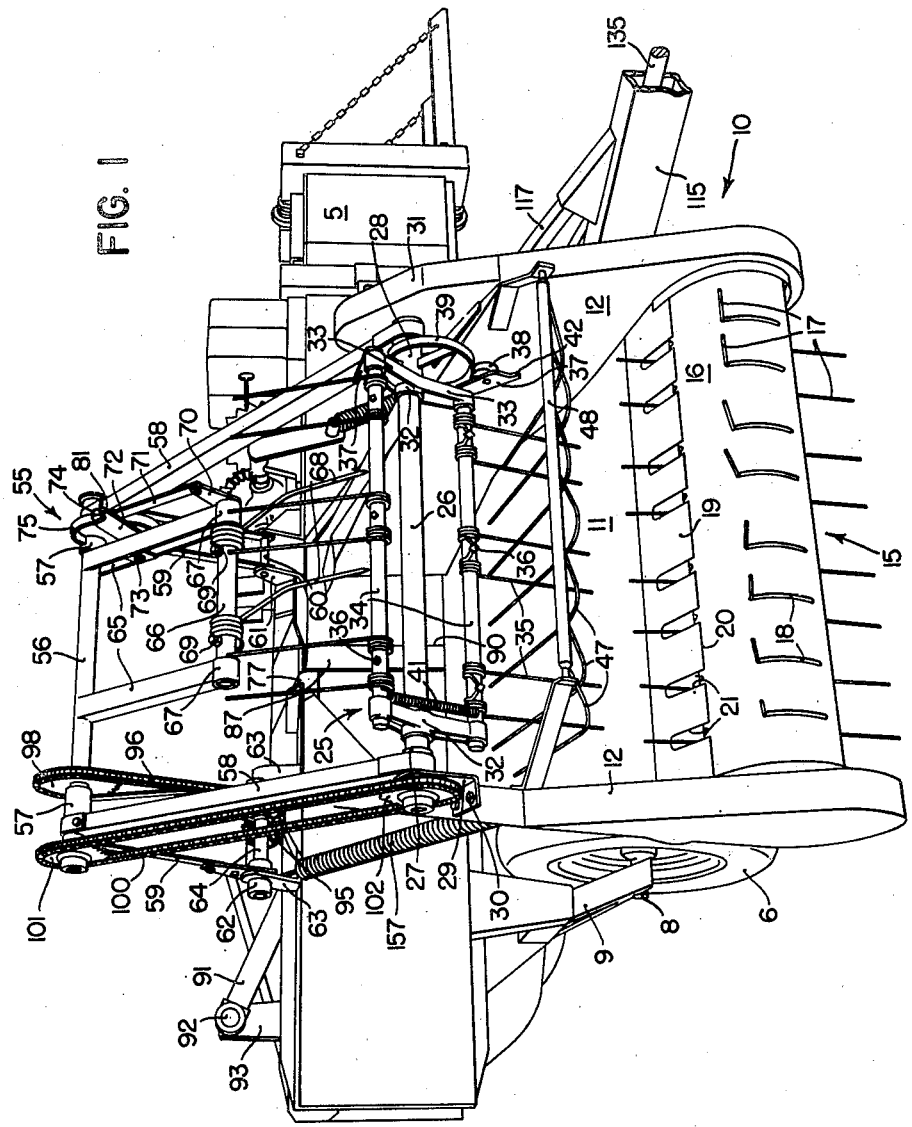

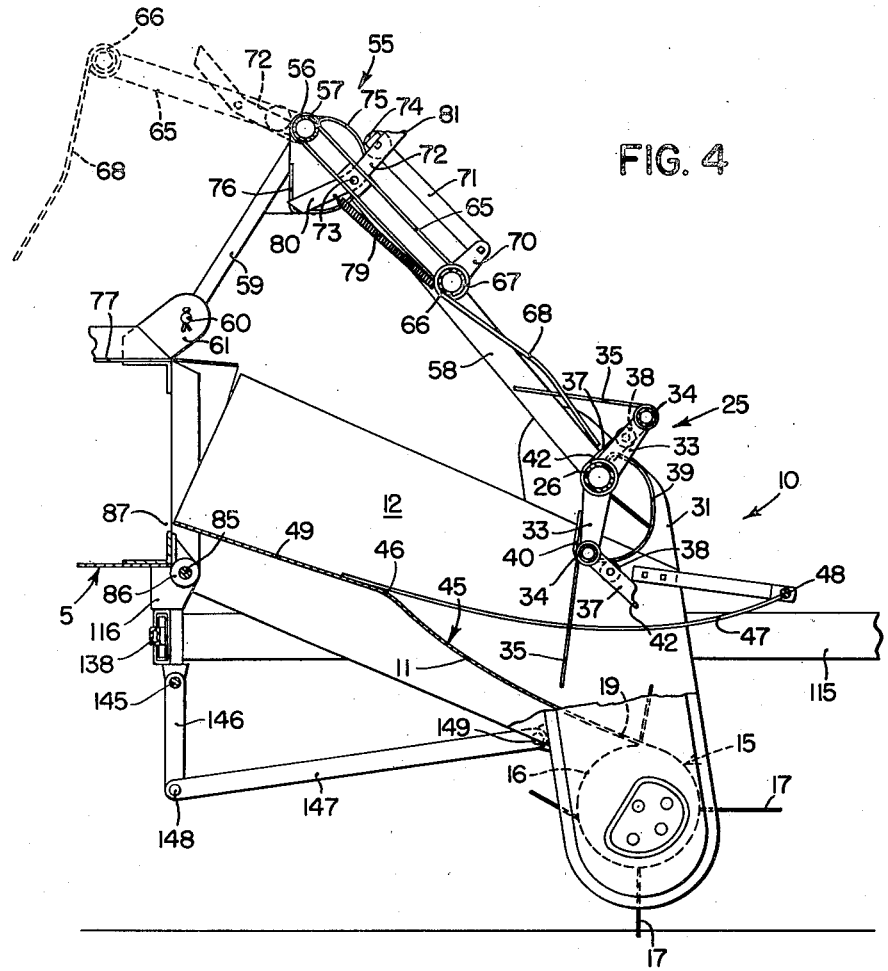
FIG. 4
*INVENTOR.*
MILES H. TUFT
ATTORNEYS

Patented Mar. 7, 1950

2,499,615

UNITED STATES PATENT OFFICE 2,499,615

AGRICULTURAL IMPLEMENT

Miles H. Tuft, San Gabriel, Calif., assignor, by mesne assignments, to Deere Manufacturing Co., a corporation of Iowa Application May 19, 1945, Serial No. 594,685

14 Claims. (Cl. 56—364)

The present invention relates generally to agricultural implements, and particularly to that class of implements in which the implement is drawn behind a tractor and travels through a field picking up harvested crops and delivering the crops to a crop treating body, such as, for example, a baling press, which compresses the harvested crops into bales, ties the bales, and discharges them upon the field for later collection.

The principal object of my invention relates to the provision of a novel and improved mechanism for gathering the crop material in the field and delivering it to the body of the implement. One feature of the platform and feeder mechanism resides in the total elimination of all flexible endless feeders such as canvases, raddle chains and the like, but at the same time maintaining close and accurate control of the flow of crops into the baling chamber of the implement.

These and other objects and advantages of my invention will be apparent to those skilled in the art after a consideration of the following description and the drawings appended hereto, in which Figure 1 is a perspective view of a baling press embodying the principles of the present invention.

Figure 2 is a perspective view of the implement, taken from the left hand side.

Figure 3 is a sectional plan view of the tubular draft member and the telescoping power shaft extending therethrough and Figure 4 is a sectional elevational view taken approximately along the center line of the platform and feeder mechanism.

Referring now to the drawings, the baling press comprises a bale case 5 disposed transversely of the direction of travel and supported on a pair of laterally spaced ground wheels 6, 7, each of which is journaled on an axle 8 mounted on a leg 9 which is fixed to the bottom of the bale case 5 and extends downwardly therefrom.

A platform, indicated in its entirety by reference numeral 10, extends forwardly from the intermediate portion of the bale case 5 and comprises an imperforate floor plate 11 having a unique shape, which will be described later, and a pair of vertically disposed side walls 12 which converge rearwardly along opposite side edges of the floor plate 11. Extending across the forward end of the platform is a pickup device 15, which is preferably of the type shown and described in detail and claimed in Patent 2,347,907 granted May 2, 1944 to George B. Hill, although it is to be understood that the present invention is not limited to this particular type of pickup device. For present purposes, it is sufficient to state that the pickup device 15 comprises a cylindrical drum 16 having four circumferentially spaced rows of axially spaced crop engageable fingers 17, which are mounted within the drum 16 and extend outwardly through circumferentially extending slots 18.

During operation, the drum is rotated in a counterclockwise direction, as viewed in Figure 4, by means which will be described later, causing the fingers 17 to engage the crops on the ground and lift them upwardly over the front of the drum 16, transferring the crops to a scraper plate 19, which is fixed to the forward edge of the floor plate 11. The scraper plate 19 is disposed generally tangentially to the drum 16 and has a front edge 20 which is adapted to scrape the crop material from the drum 16 and which is provided with longitudinally extending slots 21 for receiving the fingers 17, the latter being of the feathering type which are drawn downwardly through the slots 21 to disengage them from the crops.

Above the pickup device 15 is a rotary feeder, indicated generally by reference numeral 25 and comprising a main supporting shaft 26, which is journaled at opposite ends thereof, respectively, in a pair of bearing sleeves 27, 28. The bearing sleeve 27 is mounted on a bracket 29 which is secured by bolts 30 to the side wall 12 on one side of the platform, and the other sleeve 28 is mounted on a drive housing 31 which is mounted on top of the opposite side wall 12. The shaft 26 carries a pair of laterally spaced spiders 32, each of which has a plurality of arms 33, the preferred embodiment including two arms 33 in each spider, which carry a pair of transversely extending shafts 34, journaled at opposite ends thereof, respectively, in the arms 33. Each of the shafts 34 is provided with a plurality of spring tines or fingers 35 which are fixed by bolts 36 to the shaft 34. Each of the shafts 34 is provided with an actuating arm 37, rigidly fixed thereto outside of one of the spiders 32, the arm 37 having a camming roller 38 rotatably mounted thereon in a position to engage a cam or track 39 fixed to the bearing sleeve 28 and formed of a bowed piece of strap material. During rotation of the feeder 25 in a clockwise direction as viewed in Figure 4, the roller 38 engages the track 39 as each shaft 34 moves downwardly in front of the supporting shaft 26. Engagement of the roller 38 with the track 39 forces the arm 37 forwardly and rotates the shaft 34 to bring the fingers 35 into a generally vertical downwardly pointing position, causing the fingers to be inserted into the mass of crop material that is lifted to the plate 19 by the pickup device 15. Further rotation of the feeder 25 swings the fingers 35 rearwardly over the floor plate 11 while maintaining them in a generally vertical position, whereby they sweep the harvested crop material rearwardly over the platform. Just as the shaft 34 begins to move upwardly in back of the supporting shaft 26, the roller 38 leaves the track 39, since the latter is bent sharply upwardly, as indicated at 40 in Figure 4. This permits the shaft 34 to rotate relative to the spider arms 33, whereby the fingers 35 maintain a generally vertical position as they are withdrawn upwardly out of engagement with the crop material on the platform. This movement, in which the fingers 35 rotate in a counterclockwise direction about the axis of the shaft 34, is encouraged by a coil spring 41 which is attached by rivets or bolts to the two shafts 34 on the trailing side of each shaft, the spring 41 being stressed in tension to bias each of the shafts 34 in a counterclockwise direction. The outer end of each of the arms 37 is provided with a stop finger 42, which moves into engagement with the shaft 26 by the counterclockwise rotation of the shaft 34 and fingers 35. In Figure 4, the fingers 35 at the top of the feeder 25 are in a completely retracted position, in which the actuating arm 37 is in a position with its stop finger 42 in engagement with the shaft 26, while the lower fingers 35 are in crop engaging position with the roller 38 on the actuating arm 37 in camming engagement with the track 39 to hold the fingers 35 vertical against the tension of the spring 41. The floor surface in the forward portion of the platform is slightly concave, as indicated at 45, and is inclined upwardly and rearwardly at a comparatively steep angle from the scraper plate 19 over the pickup drum 16 to a part approximately midway between the front and rear ends of the platform, where the floor plate 11 is bent downwardly, forming a hump 46 extending transversely across the platform. The floor plate from the hump 46 rearwardly to the rear end of the platform is inclined at an angle more nearly horizontal; that is to say, the slope of the rear portion of the floor is less than the slope at the forward portion of the floor.

Rotation of the feeder 25 moves the fingers 35 rearwardly over the forward inclined portion 45 of the floor 11, thereby moving the crop material thereon rearwardly to the hump 46. The crop material is retained on the concave floor portion 45 by means of a plurality of retaining members 47 in the form of longitudinally extending laterally spaced rods which are swingably supported at their forward ends on a transverse supporting bar 48, turning downwardly and rearwardly therefrom in converging relation to the upwardly inclined forward portion 45 of the floor 11, and the rear ends of the rods 47 rest upon the hump 46 in the floor, but are movable vertically away from the latter as the crop material is forced under the rods 47 by the crop engaging fingers 35. The rods 47 are spaced laterally to receive therebetween the fingers 35 to prevent interference between the fingers and the rods. The rods 47 also aid in stripping the crop from the fingers 35 when the latter are withdrawn upwardly as they pass over the top of the feeder 25.

The crops are moved rearwardly over the upper or rear portion 49 of the floor 11 by means of another rotatable feeder 55, which includes a rotary shaft 56. Each end of the feeder shaft 56 is journaled in a bearing sleeve 57 above the two side walls 12 of the platform, respectively. Each of the bearing sleeves 57 is supported on a pair of front and rear articulated links 58, 59, respectively. The front links 58 are swingably connected to the bearing sleeves 27, 28 of the forward feeder 25, for swinging movement about the axis of rotation of the feeder shaft 26 while the rear ends of the links 58 are mounted on the bearing sleeves 57 of the rear feeder 55. The rear links 59 are swingably mounted on the sleeve 57 and are pivotally supported at their rear and lower ends on the top of the bale case 5. One of the links 59 is swingably mounted on a shaft 60 carried in brackets 61 fixed to the bale case 5, while the other rear link 59 is swingably mounted on a pair of laterally spaced bearing sleeves 62, which are supported on brackets 63 on top of the bale case 5, and also support a rotatable drive shaft 64, the axis of rotation of which is coaxial with the pivot pin 60.

The feeder 55 further includes a pair of radially extending arms 65 spaced laterally and supported rigidly on the shaft 56. The outer ends of the arms 65 support therebetween a feeder shaft 66, which is journaled in bearings 67 at the ends of the arms 65, respectively. A pair of spring tines or fingers 68 are secured by bolts 69 to the shaft 66 and are spaced to pass between the fingers 35 of the forward feeder 25 in overlapping relation, thereby tending to strip off any crop material that tends to cling to the fingers 35 as the latter are raised out of crop engaging position.

One end of the shaft 66 is provided with an actuating arm 70, which is connected by a link 71 to a camming arm 72 pivotally connected at 73 to one of the arms 65. A roller 74 is journaled on the side of the camming arm 72 and engages a cam or track 75, which is rigidly fixed to the associated bearing sleeve 57.

During rotation of the feeder shaft 56, the arms 65 and fingers 68 swing downwardly behind the front feeder 25 in substantially aligned position, as shown in solid lines in Figure 4. The radius of the cam 75 increases, causing the arm 72 to swing in a clockwise direction and acting through the link 71 to force the fingers 68 downwardly in a generally vertical position into the crops delivered to the rear portion 49 of the platform floor 11. The roller 74 disengages the cam, which is turned upwardly sharply at 76, thereby permitting the shaft 66 and fingers 68 to rotate in a counterclockwise direction relative to the arms 65 as the latter rotates in a clockwise direction. This causes the fingers 68 to be withdrawn from the top of the bale case 5 in a substantially vertical position, as indicated in dotted lines in Figure 4. The top of the bale case 5 is provided with longitudinally extending slots 77 through which the fingers 68 move rearwardly through the bale case and thereby discharging crop material from the platform into the bale case. A tension spring 79 is connected to an arm 80 extending on the opposite side of the pivot 73 from the arm 72 and fixed to the latter. The other end of the spring 79 is anchored to the shaft 66 and tends to swing the fingers 68 in a counterclockwise direction. The arm 72 is provided with a stop finger 81 which engages the shaft 56 after the roller 74 leaves the cam 75, as indicated in dotted lines in Figure 4.

The rear end of the platform 10 is swingably connected to the bale case by transverse pivot means including pins 85, which are supported in bearings 86 mounted on the front of the bale case 5, thereby providing for vertical swinging movement of the platform about the transverse axis of the pivots 85 relative to the main frame or bale case of the implement to raise and lower the pickup device 15 relative to the ground. Vertical swinging movement of the platform 10 has the effect of raising and lowering the rear feeder 55 slightly through the articulated links 58, 59, and thereby maintaining the path of the fingers 68 in the proper relation to the rear portion 49 of the floor plate 11 and also the feed opening 87 in the front of the bale case while preventing interference between the fingers 68 and the platform floor 11.

The crops are compressed within the bale case by means of a plunger 90 which is reciprocated within the bale case by means of a connecting rod 91 swingably connected at 92 to a crank arm 93 on the crank shaft. Bales are tied by automatic wire tying mechanism 94, the details of which are not a part of the present invention.

Power to drive the feeders 25, 55, and the pickup device 15, is obtained from the drive shaft 64, which in turn receives power through a pair of beveled gears 95, which are connected by means (not shown) to the crank shaft of the baling mechanism. A drive chain 96 is trained over a pair of sprockets 97, 98, fixed to the shaft 64 and to the feeder shaft 56, respectively. A second drive chain 100 is trained around a pair of sprockets 101, 102, fixed to the shafts 56, 26, respectively, of the two feeders 55, 25. A third chain 103 interconnects a pair of sprockets 104, 105, fixed to the feeder shaft 26 and to the pickup drum 16, respectively, and extends therebetween through a chain housing 106, which communicates with the upper chain housing 31, within which the sprocket 104 is contained. A pair of idlers 107, 108 are journaled within the chain housing 31, and the chain 103 is trained over these idlers and under the sprocket 104 in order that the pickup drum 16 may be driven in the opposite direction of rotation relative to the feeders. Inasmuch as the various sprockets in the series of drive chains are rotatable about the axes of swinging movement of the links 58, 59, vertical movement of the platform relative to the bale case does not have any effect upon the drive chain.

The implement is drawn by a tractor or other prime mover through a tubular draft tongue 115, preferably of rectangular cross section. The tongue 115 is mounted at its rear end in a bracket 116, supported beneath the bale case 5. The tubular tongue 115 extends obliquely forwardly and toward the left in order to position the implement in an offset relation to the tractor, and the forward end of the tubular tongue 115 is supported by an upwardly and rearwardly extending bracing member 117 connected to the tongue 115 at its forward end and to the bale case at its rearward end by means of bolts 118. The tongue 115 is secured against lateral movement by means of a forwardly converging bracing member 119, the rear end of which is connected with the wheel supporting leg 9.

The forward end of the tubular tongue 115 carries a drawbar 120 which is pivotally mounted on a transverse bolt 121 supported on a pair of upwardly extending brackets 122, the latter being secured by a pair of bolts 123 on opposite sides of a collar 124 secured to the forward end of the tongue 115. The forward end of the drawbar 120 is provided with a clevis 125 which can be connected with the drawbar of a tractor, indicated by reference numeral 126, by means of a vertical draft pin 127. The drawbar 120 extends rearwardly from the pivot bolt 121 and is pivotally connected at its rearward end by means of a bolt 128 to a bracket 129 fixed beneath the draft tongue 115.

The drawbar 120 is vertically adjustable relative to the draft tongue 115 by removing the rear pivot bolt 128 and swinging the drawbar 120 vertically about the forward pivot bolt 121, the rear end of the drawbar being provided with a plurality of holes 130 adapted to receive the bolt 128 in vertically adjusted position. The drawbar 120 is additionally adjustable vertically by removing the bolts 123 and pivoting the drawbar 120 vertically about the axis of the bolt 128, and the vertical brackets 122 are provided with a series of vertically spaced apertures 131, through which the bolts 123 can be inserted after the angularity of the drawbar 120 has been determined.

Power for driving the pickup and baling mechanism is obtained from the tractor power takeoff shaft by conventional connections including a short shaft section 133 over the draft pin connection 127, and a universal joint 134 to a power shaft 135 which extends through the tubular draft member 115 and is supported in a pair of axially spaced bearings 136. The bearings 136 are mounted within a tubular section 137, which slidably fits within the forward end of the draft member 115 in telescoping arrangement. The inner section 137 is also square in cross section and is thus secured against rotation but is permitted to slide forwardly out of the end of the tube 115 as the tractor and implement pass over rolling ground. The power shaft 135 is one member of a pair of telescoping power shaft members and fits into the end of a tubular shaft member 138 in a conventional manner. The rear section 138 is connected through a universal joint 139 to a longitudinally extending shaft 140 supported in a pair of fore and aft spaced bearings 141 mounted on pedestals 142 beneath the bale case 5. A V-belt pulley 143 is fixed to the rear end of the shaft 140 and is connected by a V-belt 144 to drive the baling and pickup mechanism.

When the implement is attached to the tractor, the drawbar 120 is first secured to the tractor drawbar 126, after which the drawbar 120 is adjusted angularly relative to the tubular draft member 115, in order to adjust the height of the power shaft 135 to the height of the power takeoff shaft.

The pickup device is adjusted vertically relative to the ground by means of a rockshaft 145 mounted transversely beneath the platform and having a pair of laterally spaced arms 146 attached thereto. The arms 146 are connected to a pair of compression links 147, respectively, by pivot bolts 148, and the compression links 147 extend forwardly and are pivotally connected at 149 to the forward portion of the platform. Thus, by rocking the arms 146 forwardly, a force is transmitted through the compression links 147 to raise the platform 10 upwardly about the axis of its pivot connection 85. The rockshaft 145 is rocked by means of an adjusting chain 150 which is secured to one of the arms 146 and extends forwardly under the tubular draft member 115, and passes through an aperture 152 in a plate 151 rigidly fixed to the bottom of the draft member 115. Thus, to raise the platform, the chain 150 is pulled through the apertured plate 151. The aperture 152 in the plate is in the form of a keyhole which is adapted to retain the chain in adjusted position.

The platform 10 is counterbalanced by means of a first counterbalancing spring 155 which is connected at its rear end to one of the arms 146 and extends forwardly under the tubular draft member 115, the forward end of the spring 155 being secured to a plate 156 which is rigidly fixed, as by welding, to the bottom of the tubular draft member 115. A second spring 157 is secured to the bearing bracket 63 on the opposite end of the platform and extends downwardly and forwardly and is connected at its forward end to the side wall 12 on that side of the platform.

I claim:

1. For use in an agricultural machine having a body and a platform pivotally mounted thereon, the combination of two pairs of articulated links spaced laterally to receive therebetween a rotatable feeder, means journalling said feeder for rotation substantially coaxially with the axis of articulation of said links, means for pivotally mounting one of each of said pairs of links on said body, and means pivotally mounting the other of each pair on said platform.

2. For use in an agricultural machine comprising a body and a platform pivotally mounted thereon, the combination of two pairs of articulated links spaced laterally to receive therebetween a rotatable feeder, means journalling said feeder for rotation substantially coaxially with the axis of articulation of said links, means for pivotally mounting one link of each of said pairs of links on said body, means pivotally mounting the other link of each pair on said platform, and a second rotatable feeder supported between said links on said platform for rotation about said pivot axis of said platform mounted links.

3. The combination set forth in claim 2, including the further provision of a power shaft journaled on said body, power transmitting means connected between said power shaft and the first-mentioned rotatable feeder, and power transmitting means connected between the two feeders for driving said second feeder.

4. An agricultural machine comprising a main frame, a platform extending forwardly therefrom and pivotally mounted thereon for vertical swinging movement relative thereto, two laterally spaced pairs of articulated links including front links pivoted coaxially on said platform adjacent the forward end of the latter and rear links pivoted coaxially on said main frame, a first feeder shaft extending between said pairs of links and journaled thereon substantially coaxially with the common axis of articulation of said pairs, a feeder mounted on said feeder shaft and rotatable therewith, a second feeder shaft extending between said pairs of links and journaled substantially coaxially with said coaxial pivots on the forward end of said platform, and a second feeder mounted on said second feeder shaft and rotatable therewith.

5. The combination set forth in claim 4, including the further provision of a power shaft journaled on said main frame substantially coaxially with said rear link pivots, a first power transmitting means interconnecting said power shaft and said first feeder shaft, and a second power transmitting means interconnecting said first feeder shaft and said second feeder shaft, said first and said second power transmitting means being movable bodily with said rear and said front links, respectively.

6. The combination set forth in claim 4, including the further provision of a power shaft journaled on said main frame substantially coaxially with said rear link pivots, a pair of power transmitting wheels fixed to said power shaft and said first feeder shaft, respectively, a flexible endless power transmitting member interconnecting said wheels, a second pair of power transmitting wheels fixed to said first and second feeder shafts, respectively, and a second flexible endless power transmitting member interconnecting said second pair of wheels.

7. An agricultural machine comprising a main frame, a platform extending forwardly therefrom and pivotally mounted thereon for vertical swinging movement relative thereto, two laterally spaced pairs of articulated links including front links pivoted coaxially on said platform adjacent the forward end of the latter and rear links pivoted coaxially on said main frame, a first feeder shaft extending between said pairs of links and journaled thereon substantially coaxially with the common axis of articulation of said pairs, a feeder mounted on said feeder shaft and rotatable therewith, a second feeder shaft extending between said pairs of links and journaled substantially coaxially with said coaxial pivots on the forward end of said platform, a second feeder mounted on said second feeder shaft and rotatable therewith, and a rotatable pick-up device mounted along the forward end of said platform and cooperable with said second feeder to deliver harvested crops to said first feeder.

8. The combination set forth in claim 7, including the further provision of a power shaft journaled on said main frame substantially coaxially with said rear link pivots, a first power transmitting means interconnecting said power shaft and said first feeder shaft, a second power transmitting means interconnecting said first feeder shaft and said second feeder shaft, and a third power transmitting means interconnecting said second feeder shaft and said pick-up device.

9. In an agricultural machine comprising a body and a platform extending forwardly therefrom, a rotary pick-up device mounted across the forward end of said platform and having crop engageable fingers for picking up crops from the field, a rotary feeder mounted over said platform above said pick-up device and having crop engageable fingers for moving said crops rearwardly on said platform, and a plurality of laterally spaced, longitudinally extending members supported on said platform and disposed between said rotary feeder and said pick-up device and in crop-stripping relation to the fingers of said rotary feeder for engaging the crops delivered to the platform by said pick-up device and retaining the crops for engagement by said feeder fingers.

10. In an agricultural machine comprising a body and a platform extending forwardly therefrom, a rotary pick-up device mounted across the forward end of said platform and having crop engageable fingers for picking up crops from the field, a rotary feeder mounted over said platform above said pick-up device and having crop engageable fingers for moving said crops rearwardly on said platform, a second rotary feeder mounted over the rear portion of said platform and having crop engageable fingers for receiving the crops from the forward feeder and delivering the crops to said body, said platform comprising a floor having a forward portion inclined upwardly and rearwardly from said pick-up device and over which said forward feeder moves the harvested crops and a rear portion inclined relative to said forward portion toward the horizontal and over which the crops are moved by said second feeder, and a plurality of laterally spaced longitudinally extending crop retaining members supported at their forward ends between said pick-up device and said feeder thereabove and having their rear ends resting upon the upper portion of said platform for retaining the crops while said feeder fingers pass between said members to move the crops rearwardly thereunder.

11. In an agricultural machine comprising a body and a platform extending forwardly therefrom, a rotary pick-up device mounted across the forward end of said platform and having crop engageable fingers for picking up crops from the field, a rotary feeder mounted over said platform above said pick-up device and having crop engageable fingers for moving said crops rearwardly on said platform, a second rotary feeder mounted over the rear portion of said platform and having crop engageable fingers for receiving the crops from the forward feeder and delivering the crops to said body, said platform comprising a floor having a forward portion inclined upwardly and rearwardly from said pick-up device and over which said forward feeder moves the harvested crops and a rear portion inclined relative to said forward portion toward the horizontal and over which the crops are moved by said second feeder, a transverse support mounted on said platform above said pick-up device, and a plurality of longitudinally extending crop retaining members mounted on said transverse support and extending rearwardly between said feeder and said forward floor portion and normally resting at their rear ends on said rear floor portion but yieldable upwardly therefrom, said members being spaced laterally to receive therebetween said fingers on the first mentioned rotary feeder.

12. In an agricultural machine comprising a body and a platform extending forwardly therefrom, a rotary pick-up device mounted across the forward end of said platform and having crop engageable fingers for picking up crops from the field, a first rotary feeder mounted over said platform above said pick-up device and having crop engageable fingers for moving said crops rearwardly on said platform, a second rotary feeder mounted over the rear portion of said platform and having crop engageable fingers overlapping said fingers on the forward mounted feeder for stripping crops therefrom, said platform comprising a floor having a concave forward portion beneath said forward feeder over which the fingers of the latter travel in moving the crops, said forward floor portion terminating in a transversely extending hump, and crop retaining means over said forward portion comprising a transverse support above said pick-up device and a plurality of retaining members mounted thereon and extending rearwardly and having their rear ends lying on said hump, said members being spaced laterally and yieldable upwardly to receive therebetween the crop engageable fingers of said first rotary feeder.

13. In an agricultural machine comprising a body and a platform extending forwardly therefrom, a rotary pick-up device mounted across the forward end of said platform and having crop engageable fingers for picking up crops from the field, a rotary feeder mounted over said platform above said pick-up device and having crop engageable fingers for moving said crops rearwardly on said platform, said platform comprising a floor having a forward portion inclined upclined upwardly and rearwardly from said pickup device and over which said feeder moves the harvested crops and a rear portion inclined relative to said forward portion toward the horizontal, and a plurality of laterally spaced longitudinally extending crop retaining members supported at their forward ends between said pick-up device and said feeder thereabove and having their rear ends resting upon the upper portion of said platform for retaining the crops while said feeder fingers pass between said members to move the crops rearwardly thereunder.

14. An agricultural machine, comprising: a body; a platform pivotally connected thereto for swinging movement about a horizontal axis; first link means pivotally mounted on the body for movement about an axis parallel to the platform pivot axis; second link means, pivotally mounted on the platform on an axis parallel to the aforesaid axes, and pivotally connected to the first link means on an axis parallel to the aforesaid axes; and a rotatable feeder journaled on at least one of the link means for movement about an axis parallel to the aforesaid axes.

MILES H. TUFT.

REFERENCES CITED

The following references are of record in the file of this patent:

UNITED STATES PATENTS

| Number | Name | Date |
| --- | --- | --- |
| 1,834,100 | Knapp et al. | Dec. 1, 1931 |
| 2,049,673 | Starr | Aug. 4, 1936 |
| 2,347,926 | Paradise et al. | May 2, 1944 |
| 2,430,734 | Raney et al. | June 12, 1945 |
| 2,388,212 | McElhoe et al. | Oct. 30, 1945 |
| 2,378,107 | Russell | Nov. 11, 1947 |